Patented Oct. 2, 1945

2,385,832

UNITED STATES PATENT OFFICE 2,385,832

COMPOSITION OF MATTER SUITABLE FOR USE AS A LUBRICANT AND LUBRICANT COMPRISING THE SAME

John M. Musselman, South Euclid, Ohio, assignor to The Standard Oil Company, Cleveland, Ohio, a corporation of Ohio No Drawing. Application October 18, 1943, Serial No. 506,751

20 Claims. (Cl. 252—48)

This invention relates to lubricants and more particularly to lubricants suited for various uses, including high pressures or high temperatures or both, as for internal combution engines operating at high temperatures or for lubricating heavy equipment. Such lubricants are subject to breakdowns due to sludge and acid formation.

This application is a continuation-in-part of applications Serial No. 376,675, filed January 30, 1941, now Patent No. 2,331,923, Serial No. 455,344, filed August 19, 1942, and Serial No. 414,977, filed October 14, 1941.

An object of the invention is to provide a new composition suitable for use as a lubricant or as an addition agent in lubricating oils and greases to prevent sludge and acid formation under operating conditions.

Another object is to provide an inhibitor of the above type having novel and improved characteristics, and comprising a dual metal compound, one of the metals being calcium, of the reaction product of an ester wax with a phosphorus sulfide.

Various other objects and advantages will be apparent as the nature of the invention is more fully disclosed.

Although the novel features which are believed to be characteristic of this invention are pointed out more particularly in the claims appended hereto, the invention will be better understood by referring to the following description in which certain specific embodiments thereof have been set forth for purposes of illustration.

In accordance with the present invention I have found that certain oxygen-containing ester waxes may be treated with a sulfide of phosphorus and that the reaction product thereof may be converted in a dual metal compound thereof, one of the metals being calcium. If the proportions of the wax and sulfide are such and the temperature conditions high enough, a reaction product containing sulfur and having a minimum of oxygen and phosphorus is produced. This is the preferred embodiment of the intermediate product to be converted into the dual metal calcium-containing compound thereof. If these conditions do not obtain, the reaction product is or may contain a thiophosphate. The reaction product is separated from a sludge containing oxygen and phosphorus, probably in the form of oxides of phosphorus, along with other materials. In the preferred embodiment, the reaction indicated by the observed facts appears to be one in which sulfur replaces the major portion of the oxygen in the wax, and the displaced oxygen combines with the phosphorus to form a phosphorus oxide which can be removed with the sludge. When a thiophosphate is formed, the phosphorus content of the sulfide or at least a part of it is combined in wax.

The reaction product may then be reacted with a plurality of metal compounds, one of which is calcium, to form the corresponding dual metal calcium-containing compound or compounds of the reaction product. Such dual metal compound or compounds have been found to possess characteristics suitable for use per se as a lubricant or for use as an inhibitor in various lubricating oils and greases.

In the preferred embodiment it is important that the reaction between the wax and the phosphorus sulfide be carried out at a temperature above the temperature of thiophosphate formation so that a minimum of phosphorus enters into the reaction product. The reaction product, therefore, is substantially free from or has a minimum of phosphorus or thiophosphates. Also, a minimum of oxygen remains in wax, since the phosphorus eliminates the removable oxygen from the wax, probably as a phosphorus oxide.

In the preferred embodiment it is also important that the amount of the phosphorus sulfide be at least equivalent to the theoretical quantity required for the sulfur to replace the oxygen of the wax. Since the atomic weight of sulfur is just double that of oxygen, it is desirable to use an amount of a phosphorus sulfide, such that the weight of the sulfur therein is double the weight of the oxygen contained in the wax. An excess of the theoretical amount may be of assistance in forcing the reaction to completion. The excess should not be too great, since at least part of any excess remains dissolved in the reaction product and increases the phosphorus content, as well as sulfur content, in the molal ratio present in phosphorus pentasulfide.

When practicing the invention on a commercial scale, it is practical to form the reaction product with less than 2% of oxygen and 1.5% of phosphorus.

The process is applicable to various oxygen-containing ester waxes, such as degras, lanolin, beeswax, sperm oil, carnauba wax, Japan wax, Chinese wax, spermaceti, whale oil, and the like. The phosphorus sulfide, preferably, may be in the form of phosphorus pentasulfide or phosphorus sesquisulfide.

After the reaction is completed, any phosphorus oxide or oxides which separate out as a sludge, together with any other insoluble materials, may be removed from the reaction product by settling, centrifuging or filtering.

The reaction product prepared as above described may then be reacted with a calcium compound and the compound of some other metal, preferably a metal other than another alkaline earth metal. The compounds of the metals, preferably, are the oxides and hydroxides, since they do not form by-products other than water, and the latter is easy to remove. These metal compounds of the reaction product have the property of stabilizing mineral oil against breakdown and exercise a peptizing action or detergency tending to maintain the solids in suspension. They also raise the viscosity index of the oil and lower the cold test.

The inclusion of the calcium compound imparts excellent peptizing action or detergency which is always a desirable characteristic irrespective of the properties desired or imparted by other ingredients. The inclusion of an alkali metal compound imparts emulsifying properties which is desirable in some instances. The inclusion of a metal other than an alkali or alkaline earth metal imparts desirable metal inhibition properties.

The two metals to be included in the compound, and their relative proportions, should be selected with reference to the properties desired in the composition, and the use to which it or the lubricant containing it is to be put. In general, when the lubricant is to be used under high temperature conditions, such as in an internal combustion engine, it is preferred that the metal other than calcium, not be iron, copper or other metal which may exert a pro-oxidant effect. However, iron and copper-containing compounds are quite useful themselves or as additives in a gear box and similar type lubricants and greases.

As a specific example of one of the preferred embodiments, degras may be reacted with about 18 to 25%, preferably about 23%, by weight of phosphorus pentasulfide at a temperature between 275° F. and 350° F., preferably 300° F. Degras has an oxygen content (by analysis) of 6 to 7%. An exothermic reaction occurs and generally a reaction time of an hour or slightly more or less is involved. The temperature is above the temperature of thiophosphate formations and may be carried out without introducing a substantial amount of phosphorus into the reaction product. If a lower temperature is used a thiophosphate may be formed. The phosphorus and oxygen-containing sludge may be removed.

The reaction product, depending on the proportions of ingredients and the temperature will contain 10 to 13% sulfur, 0.75 to 1.50% phosporus, and 0.9 to 2.0% oxygen.

The reaction product is then treated with calcium oxide or calcium hydroxide and the oxide or hydroxide of some other metal, such as sodium, potassium, barium, magnesium, lithium, strontium, chromium, aluminum, antimony, arsenic, mercury, bismuth, etc. to form the dual-metal compound. This reaction may take place at around 210° to 250° F. for a period of about 1 to 2 hours.

The amount of the metal compounds used to treat the reaction product will depend upon the characteristics desired in the final compound. In general 1.5 to 15% of calcium oxide or hydroxide and 1.5 to 15% of oxide or hydroxide of the other metal is preferred, based on the wax-sulfide reaction product. In a specific illustrative example 5% each of calcium oxide and arsenic trioxide are used based on the reaction product.

The amount of the metal compounds also will depend upon whether the reaction product is to be completely or partially saponified. If desired, the amounts of the metal compounds may be such as only to partially saponify the reaction product forming a mixture of the unsaponified reaction product and the metal compound or compounds thereof. Such a mixture is advantageous under some circumstances since it embodies the features characteristic of the dual-metal saponified product together with characteristics attributed at least in part to the presence of polar groups in the unsaponified portion.

In those instances where the oxides or hydroxides of the metals react directly with the wax-sulfide reaction product to saponify it (which is the case with calcium and some other metals), the preferred procedure is to use the oxides or hydroxides of the two metals. They may be added to the reaction product and reacted with it together or separately.

If the oxides or hydroxides of the metal other than calcium is not sufficiently reactive, the initial wax-sulfide reaction product may be partly neutralized with caustic soda or potash and the resulting salt may be then reacted with a metal salt, such as the chloride or sulfate, to replace all or a part of the sodium and to form the desired metal compound through a double decomposition reaction. The calcium may be introduced simultaneously with the alkali metal or after the double decomposition reaction.

I am not certain if both of the metals become chemically combined in a single molecule or if the new composition or additive comprises a mixture in which the two metals are each in different molecules. However, I intend either possibility to be covered and included within my description of the dual metal compounds of the reaction product.

The above composition has been found suitable for use as a lubricant per se and is particularly effective as an inhibitor when used even in small percentages in lubricating oils and greases.

The amount of the above described metal compound of the reaction product to be added to the oil or grease will depend on the characteristics of the oil or grease and its intended use. Some oils have more of a tendency to form acid and sludge than others and such oils require large quantities of the addition agent. Also, oils that are intended for high temperature use, especially in the presence of pro-oxidant catalyst require larger amounts. In general the range is from 1 to 10%, but under some circumstances amounts as small as 0.01% show a remarkable improvement. Since the addition agent is a lubricant itself there is no upper limit to the amount that may be added to an oil.

An S. A. E. 20 lubricating oil containing 5% of the dual-metal salt of calcium and arsenic, when subjected to a standard twenty hour test in an Ethyl Gasoline Corporation type test engine, shows a remarkable improvement with reference to sludge formation, acid number, viscosity increase, and deposit on the piston skirt, as compared with the same oil without the addition agent when treated under similar conditions.

The particularly excellent peptizing action or detergency of the compound may be shown by the test method measuring the ability of the lubricants containing the additive to maintain carbon black in suspension. A similar carbon black suspension in an oil not containing the calcium-containing dual-metal compound settles out relatively quickly. The dual-metal compounds of the present invention are particularly valuable for addition to mineral oils suitable for Diesel type engine operation where products of composition produce materials tending to block up small openings.

As a further illustration of the invention, degras was reacted with 23% of phosphorus pentasulfide at 300° F. for 2 hours, and the sludge formed was then separated. The reaction product was then saponified with a mixture of lime and potash in amounts such that equal molar quantities of each were used (3% of calcium hydroxide and 4.5% of potassium hydroxide) These quantities were such as to produce a soap having a pH value of 7 or slightly higher, indicating complete saponification. After saponifying, the metal compound of the reaction product was filtered and added to a Mid-Continent S. A. E. 30 motor oil in an amount of 3%. This was then subjected to a standard 20 hour test in an Ethyl Gasoline Corporation type test engine. At the conclusion of the run, the sludge was 0.50%; the acid number was 0.52; the viscosity increase was 33; and the skirt rating number was 0.0. In contrast, the same S. A. E. 30 oil, without the addition agent, was run under identical conditions and showed 4.00% sludge; an acid number of 4.50; a viscosity increase of 350; and a skirt rating number of 8.0 to 10.0.

If it is desired, additional sulfur may be incorporated into the reaction product for increasing the total sulfur content. Experience has shown that such sulfur can be added either to the wax-sulfide reaction product or to the metal compound thereof. It is believed that such a reaction is one of adding sulfur to the sulfur already present, perhaps to form disulfides or polysulfides.

While a particular embodiment of the invention has been described, it will be understood that the invention is capable of various adaptations which will be readily apparent to a person skilled in the art. The invention is to be restricted in accordance with the scope of the following claims.

I claim:

1. A composition of matter suitable for use as a lubricant and as an addition agent to improve the characteristics of lubricating oils and greases, comprising a calcium-containing dual-metal compound of the reaction product of a phosphorus sulfide and an oxygen-containing wax.

2. A composition of matter suitable for use as a lubricant and as an addition agent to improve the characteristics of lubricating oils and greases, comprising a calcium-containing dual-metal compound of the reaction product of phosphorus pentasulfide and degras.

3. A composition of matter suitable for use as a lubricant and as an addition agent to improve the characteristics of lubricanting oils and greases, comprising a calcium-containing dual-metal compound of the reaction product of a phosphorus sulfide and an oxygen-containing wax reacted in proportions and at a temperature to replace a major portion of the oxygen in the wax with sulfur.

4. A composition of matter suitable for use as a lubricant and as an addition agent to improve the characteristics of lubricating oils and greases, comprising a calcium-containing dual-metal compound of the reaction product of a phosphorus sulfide and an oxygen-containing wax reacted in proportions and at a temperature to form a product having less than 2% of oxygen and 1.5% of phosphorus.

5. A composition of matter suitable for use as a lubricant and as an addition agent to improve the characteristics of lubricating oils and greases, comprising a calcium-containing dual-metal compound of the reaction product of phosphorus pentasulfide and degras reacted in proportions and at a temperature to form a product having less than 2% of oxygen and 1.5% of phosphorus.

6. A composition of matter suitable for use as a lubricant and as an addition agent to improve the characteristics of lubricating oils and greases, comprising a dual-metal compound, one of the metals being calcium and the other a metal other than an alkaline earth, of the reaction product of a phosphorus sulfide and an oxygen-containing wax reacted in proportions and at a temperature to form a product having less than 2% of oxygen and 1.5% of phosphorus.

7. A composition of matter suitable for use as a lubricant and as an addition agent to improve the characteristics of lubricating oils and greases, comprising a dual-metal compound, one of the metals being calcium and the other a metal other than an alkaline earth, of the reaction product of phosphorus pentasulfide and degras reacted in proportions and at a temperature to form a product having less than 2% of oxygen and 1.5% of phosphorus.

8. A lubricant comprising a mineral lubricating oil and an addition agent comprising a calcium-containing dual-metal compound of the reaction product of a phosphorus sulfide and an oxygen-containing wax.

9. A lubricant comprising a mineral lubricating oil and an addition agent comprising a calcium-containing dual-metal compound of the reaction product of a phosphorus sulfide and an oxygen-containing wax reacted in proportions and at a temperature to replace a major portion of the oxygen in the wax with sulfur.

10. A lubricant comprising a mineral lubricating oil and an addition agent comprising a dual-metal compound, one of the metals being calcium and the other a metal other than an alkaline earth, of the reaction product of a phosphorus sulfide and an oxygen-containing wax reacted in proportions and at a temperature to form a product having less than 2% of oxygen and 1.5% of phosphorus.

11. A lubricant comprising a mineral lubricating oil and an addition agent comprising a dual-metal compound, one of the metals being calcium and the other a metal other than an alkaline earth, of the reaction product of phosphorus pentasulfide and degras reacted in proportions and at a temperature to form a product having less than 2% of oxygen and 1.5% of phosphorus.

12. The process for making a composition suitable for use as a lubricant and as an addition agent to improve the characteristics of lubricating oils and greases, comprising reacting a phosphorus sulfide with an oxygen-containing wax at a temperature to prevent thiophosphate formation and to remove the major portion of the oxygen in the wax by reaction with the phosphorus in the sulfide, removing the phosphorus and oxygen-containing sludge from the reaction product, and reacting said product with compounds of a plurality of metals, one of which is calcium.

13. The process for making a composition suitable for use as a lubricant and as an addition agent to improve the characteristics of lubricating oils and greases, comprising reacting phosphorus pentasulfide with degras at a temperature to prevent thiophosphate formation and to remove the major portion of the oxygen in the degras by reaction with the phosphorus in the sulfide, removing the phosphorus and oxygen-containing sludge from the reaction product, and reacting said product with compounds of a plurality of metals, one of which is calcium.

14. The process for making a composition suitable for use as a lubricant and as an addition agent to improve the characteristics of lubricating oils and greases, comprising reacting a phosphorus sulfide and an oxygen-containing wax in proportions such that the sulfur in the sulfide is at least stoichiometrically as great as the oxygen in the wax and at a temperature such that the major portion of the oxygen in the wax is combined with the phosphorus in the sulfide, removing the phosphorus and oxygen-containing sludge from the wax-sulfur reaction product, and reacting said wax-sulfur product with a plurality of metal compounds, one of which is calcium.

15. The process for making a composition suitable for use as a lubricant and as an addition agent to improve the characteristics of lubricating oils and greases, comprising reacting a phosphorus sulfide and an oxygen-containing wax in proportions such that the sulfur in the sulfide is at least stoichiometrically as great as the oxygen in the wax and at a temperature such that the major portion of the oxygen in the wax is combined with the phosphorus in the sulfide, removing the phosphorus and oxygen-containing sludge from the wax-sulfur reaction product, and reacting said wax-sulfur product with a plurality of metal compounds, one of which is lime and the other is a reactive compound of a metal other than an alkaline earth.

16. The process for making a composition suitable for use as a lubricant and as an addition agent to improve the characteristics of lubricating oils and greases, comprising reacting phosphorus pentasulfide and degras in proportions such that the sulfur in the sulfide is at least stoichiometrically as great as the oxygen in the degras and at a temperature such that the major portion of the oxygen in the degras is combined with the phosphorus in the sulfide, removing the phosphorus and oxygen-containing sludge from the degras-sulfur reaction product, and reacting said degras-sulfur product with lime and a reactive compound of a metal other than an alkaline earth.

17. The process for making a composition suitable for use as a lubricant and as an addition agent to improve the characteristics of lubricating oils and greases, comprising reacting phosphorus pentasulfide and degras in proportions such that the sulfur in the sulfide is at least stoichiometrically as great as the oxygen in the degras and at a temperature such that the major portion of the oxygen in the degras is combined with the phosphorus in the sulfide, removing the phosphorus and oxygen-containing sludge from the degras-sulfur reaction product, reacting a portion of said degras-sulfur product with lime, and reacting another portion with an alkali metal caustic and then with a compound of a metal other than an alkali and alkaline earth metal.

18. A composition of matter suitable for use as a lubricant and as an addition agent to improve the characteristics of lubricating oils and greases, comprising a calcium-arsenic dual-metal compound of the reaction product of a phosphorus sulfide and an oxygen-containing wax.

19. A composition of matter suitable for use as a lubricant and as an addition agent to improve the characteristics of lubricating oils and greases, comprising a calcium-arsenic dual-metal compound of the reaction product of a phosphorus sulfide and an oxygen-containing wax reacted in proportions and at a temperature to replace a major portion of the oxygen in the wax with sulfur.

20. A lubricant comprising a mineral lubricating oil and an addition agent comprising a calcium-arsenic dual-metal compound of the reaction product of a phosphorus sulfide and an oxygen-containing wax reacted in proportions and at a temperature to form a product having less than 2% of oxygen and 1.5% of phosphorus.

JOHN M. MUSSELMAN.